(12) United States Patent
Kim et al.

(10) Patent No.: US 11,644,730 B2
(45) Date of Patent: May 9, 2023

(54) ELECTROCHROMIC DEVICE

(71) Applicant: LG CHEM, LTD., Seoul (KR)

(72) Inventors: Yong Chan Kim, Daejeon (KR); Ki Hwan Kim, Daejeon (KR); Pil Sung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 360 days.

(21) Appl. No.: 16/604,355

(22) PCT Filed: Apr. 23, 2018

(86) PCT No.: PCT/KR2018/004666
§ 371 (c)(1),
(2) Date: Oct. 10, 2019

(87) PCT Pub. No.: WO2018/199566
PCT Pub. Date: Nov. 1, 2018

(65) Prior Publication Data
US 2020/0150505 A1    May 14, 2020

(30) Foreign Application Priority Data

Apr. 27, 2017 (KR) .......................... 10-2017-0054315
Apr. 19, 2018 (KR) .......................... 10-2018-0045419

(51) Int. Cl.
*G02F 1/153* (2006.01)
*G02F 1/1523* (2019.01)
*G02F 1/155* (2006.01)

(52) U.S. Cl.
CPC .......... *G02F 1/1533* (2013.01); *G02F 1/1525* (2013.01); *G02F 2001/1555* (2013.01); *G02F 2201/44* (2013.01)

(58) Field of Classification Search
CPC ................. G02F 1/1533; G02F 1/1525; G02F 2001/1555; G02F 2201/44
See application file for complete search history.

(56) References Cited

U.S. PATENT DOCUMENTS 4,878,743 A * 11/1989 Aikawa .................. B60R 1/088
359/271
4,917,973 A * 4/1990 Yoshimoto ............ H01M 4/587
429/91
9,110,346 B2    8/2015 Tsai et al.
(Continued)

FOREIGN PATENT DOCUMENTS

EP          1 775 625 A2      4/2007
KR    10-2008-0051280 A      6/2008
(Continued)

OTHER PUBLICATIONS

Extended European Search Report for European Application No. 18789918.2, dated Jan. 29, 2020.
(Continued)

*Primary Examiner* — George G. King
(74) *Attorney, Agent, or Firm* — Birch, Stewart, Kolasch & Birch, LLP (57) ABSTRACT

An electrochromic device including an electrode layer, an electrochromic layer and a conductive band having a closed ring shape. The electrochromic device having the above structure has excellent color-switching speeds and electrochromic uniformity.

8 Claims, 6 Drawing Sheets

(56) References Cited

U.S. PATENT DOCUMENTS

| | | | |
|---|---|---|---|
| 2001/0008458 A1* | 7/2001 | Asano | G02F 1/1533 |
| | | | 359/267 |
| 2005/0200935 A1* | 9/2005 | Liu | G02F 1/163 |
| | | | 359/265 |
| 2010/0259811 A1 | 10/2010 | Wu et al. | |
| 2013/0050798 A1 | 2/2013 | Kim et al. | |
| 2017/0371218 A1* | 12/2017 | Kailasam | G02F 1/153 |

FOREIGN PATENT DOCUMENTS

| | | |
|---|---|---|
| KR | 10-2011-0118020 A | 10/2011 |
| KR | 10-2014-0086081 A | 7/2014 |
| KR | 10-2015-0053151 A | 5/2015 |
| KR | 10-1656490 B1 | 9/2016 |
| KR | 10-1657965 B1 | 9/2016 |
| KR | 10-2017-0025612 A | 3/2017 |

OTHER PUBLICATIONS

International Search Report (PCT/ISA/210) issued in PCT/KR2018/004666, dated Jul. 30, 2018.

The CN text Book "The latest new engineering material production technology application and new product development and industry technical standards practical encyclopedia" edited by Jiang Xiaohui, Xueyuan Audio and Video Publishing House, pp. 288-290, published in Nov. 2004, with English Translation.

* cited by examiner

(a) Bleaching time (b) Coloring time

[Figure 4]

(a) Bleaching time (b) Coloring time

ELECTROCHROMIC DEVICE

CROSS-REFERENCE TO RELATED APPLICATIONS

This application claims the benefit of priority based on Korean Patent Application No. 10-2017-0054315 filed on Apr. 27, 2017 and Korean Patent Application No. 10-2018-0045419 filed on Apr. 19, 2018, the disclosures of which are incorporated herein by reference in their entirety.

TECHNICAL FIELD

The present application relates to an electrochromic device.

BACKGROUND ART

Electrochromism refers to a phenomenon in which an optical property of an electrochromic material is changed by an electrochemical oxidation or reduction reaction, where the device using the phenomenon is referred to as an electrochromic device. The electrochromic device generally comprises a working electrode, a counter electrode and an electrolyte, where optical properties of each electrode can be reversibly changed by an electrochemical reaction. For example, the working electrode or the counter electrode may comprise a transparent conductive material and an electrochromic material in the form of films, respectively, and in the case where a potential is applied to the device, as the electrolyte ions are inserted into or removed from the electrochromic material-containing film and the electrons simultaneously move through an external circuit, the optical property changes of the electrochromic material appear.

Such an electrochromic device is capable of producing devices having a large area with a small cost and has low power consumption, so that it is attracting attention as smart windows or smart mirrors, and other next-generation architectural window materials. However, since it takes a considerable time to insert and/or remove the electrolyte ions for the optical property changes of the entire area of a electrochromic layer, there is a disadvantage that the color-switching speed is slow. In addition, the electrochromic layer has different color-switching speeds depending on its positions even on the same plane, and thus there is a disadvantage that the degree of electrochromic is uneven.

DISCLOSURE

Technical Problem

It is one object of the present application to provide an electrochromic device having improved color-switching speed or electrochromic speed.

It is another object of the present application to provide an electrochromic device having uniform electrochromic degree.

The above and other objects of the present application can be all solved by the present application which is described in detail below.

Technical Solution

In one example of the present application, the present application relates to an electrochromic device. The electrochromic device of the present application may comprise, in addition to an electrode layer and an electrochromic layer located on the electrode layer, a conductive band located on the electrode layer. In the present application, the term "on" used in connection with positions between components is used in the sense corresponding to "above" or "upper part" and unless otherwise specified, it may also mean the case where the component having a relevant position directly contacts another component and simultaneously exists on the component, and may also mean the case where other components exist between them.

The electrode layer may be a transparent electrode having a light transmission characteristic. In the present application, the "light transmission characteristic" may mean a case where the transmittance for visible light is 60% or more. In addition, the "visible light" may mean light in a wavelength range of 380 nm to 780 nm, specifically, light having a wavelength of 550 nm. The upper limit of the transmittance is not particularly limited, but may be, for example, 95% or less. The light transmission characteristic can be measured by a known haze meter.

The electrode layer may have a thickness in a range of 10 nm to 450 nm. In the present application, the "thickness" may mean, when a virtual normal line is drawn from the ground toward the device surface, "the average normal distance between one side (bottom surface) of the measuring object layer and the other side (top surface) facing it.

The electrode layer may comprise a transparent conductive oxide or an OMO (oxide/metalloxide) as a light-transmitting electrode material.

In one example, as the transparent conductive oxide, ITO (indium tin oxide), $In_2O_3$ (indium oxide), IGO (indium gallium oxide), FTO (fluorodo doped tin oxide), AZO (aluminum doped zinc oxide), GZO (gallium doped zinc oxide), ATO (antimony doped tin oxide), IZO (indium doped zinc oxide), NTO niobium doped titanium oxide), ZnO (zinc oxide) or CTO (cesium tungsten oxide), and the like may be used. However, the material of the transparent conductive oxide is not limited to the above-listed materials.

The OMO (oxide/metal/oxide) may comprise an upper metal oxide layer, a lower metal oxide layer, and a metal layer provided between the two layers. The upper metal oxide layer may mean a layer located relatively farther from the electrochromic layer among the layers constituting the OMO. Since the OMO having the above structure has lower sheet resistance over the transparent conductive oxide represented by ITO, the color-switching speed of the electrochromic device can be improved.

The upper and lower metal oxide layers used in the OMO may comprise a metal oxide of Sb, Ba, Ga, Ge, Hf, In, La, Se, Si, Ta, Se, Ti, V, Y, Zn, Zr or an alloy thereof. The types of the respective metal oxides included in the upper and lower metal oxide layers may be the same or different.

In one example, the upper metal oxide layer may have a thickness in a range of 10 nm to 120 nm or in a range of 20 nm to 100 nm. In addition, the upper metal oxide layer may have a visible light refractive index in a range of 1.0 to 3.0 or in a range of 1.2 to 2.8. Having the refractive index and thickness in the above range, appropriate levels of optical characteristics can be imparted to the device.

In one example, the lower metal oxide layer may have a thickness in a range of 10 nm to 100 nm or in a range of 20 nm to 80 nm. In addition, the lower metal oxide layer may have a visible light refractive index in a range of 1.3 to 2.7 or in a range of 1.5 to 2.5. Having the refractive index and thickness in the above ranges, appropriate levels of optical characteristics can be imparted to the device.

The metal layer included in the OMO may comprise a low resistance metal material. For example, one or more metals selected from Ag, Cu, Zn, Au, Pd and an alloy thereof may be used for the metal layer as the low resistance metal material.

In one example, the metal layer of the OMO may have a thickness in a range of 3 nm to 30 nm or in a range of 5 nm to 20 nm. In addition, the metal layer may have a visible light refractive index of 1 or less, or 0.5 or less. Having the refractive index and thickness in the above ranges, appropriate levels of optical characteristics can be imparted to the device.

The method of providing the electrode layer is not particularly limited. For example, the electrode layer can be formed by a known wet or dry coating method using the electrode material or a known lamination method.

The electrochromic layer is a layer comprising an electrochromic material capable of color-switching by a reversible oxidation-reduction reaction. As the electrochromic material, a known organic material or inorganic material can be used.

In one example, the electrochromic layer may comprise a reducing electrochromic material, that is, a material that the color changes (coloring) upon reduction. More specifically, the electrochromic layer may comprise an oxide of Ti, Nb, Mo, Ta or W, such as $WO_3$, $MoO_3$, $Nb_2O_5$, $Ta_2O_5$ or $TiO_2$.

In one example, the electrochromic layer may comprise an oxidizing electrochromic material, that is, a material that the color changes (coloring) upon oxidation. More specifically, the electrochromic layer may comprise one or more from an oxide of Cr, Mn, Fe, Co, Ni, Rh or Ir, such as LiNiOx, $IrO_2$, NiO, $V_2O_5$, $LixCoO_2$, $Rh_2O_3$ or $CrO_3$; a hydroxide of Cr, Mn, Fe, Co, Ni, Rh or Ir; and prussian blue.

Without being particularly limited, the electrochromic layer may have a thickness of 400 nm or less. More specifically, the electrochromic layer may have a thickness of 30 nm or more, 50 nm or more, 100 nm or more, or 150 nm or more, and may have a thickness of 350 nm or less, or 300 nm or less.

The method of providing the electrochromic layer is also not particularly limited. For example, the electrochromic layer may be formed by applying a coating composition comprising the above-mentioned electrochromic material on an electrode layer or a base material comprising an electrode layer, and then sintering it. Alternatively, the electrochromic layer comprising the above-mentioned materials can be formed on an electrode layer or a base material comprising an electrode layer through a vapor deposition method. Besides, a method of forming an electrochromic layer separately from the electrode layer, and then laminating the electrode layer and the electrochromic layer to each other may also be used.

In the present application, the conductive band has a predetermined size expressed by a length and a breadth or a width, and a predetermined thickness. The conductive band comprises a conductive material and has a closed ring shape, that is, a form where both ends are attached to each other. The specific shape of the closed ring is not particularly limited. For example, the shape of the ring to be viewed at the top or bottom parallel to the normal direction to the device surface can be a circle, an ellipse or a polygon. In one example, the shape of the electrochromic layer to be viewed at the top or bottom parallel to the normal direction to the device surface and the closed ring shape of the conductive band to be viewed in the same direction may be the same.

The conductive band may be in direct contact with the electrochromic layer physically. As in some aspects of the present application to be described below, the conductive band in contact with the electrochromic layer does not only improve the electrochromic rate but also contributes to the uniform color-change of the electrochromic layer, because an equipotential section is formed in the electrochromic layer.

In one example, the conductive band contacts the electrochromic layer while surrounding the side surface of the electrochromic layer. In the present application, the "side surface of a layer" may mean a surface other than the upper surface and the lower surface opposite to each other in the thickness direction of the above-described layer. Specifically, the conductive band may have a closed ring shape extending along the side surface of the electrochromic layer in a state of being physically in contact with the side surface of the electrochromic layer and having both ends attached to each other. That is, the conductive band may exist in a state of surrounding the side surface of the electrochromic layer. When a voltage is applied to the device, the conductive band that is physically in contact with the electrochromic layer in the form as above contributes to widening the equipotential section of the electrochromic layer. For example, when the electrochromic layer viewed at the upper part in the normal direction to the device surface is rectangular, the conductive band surrounds the electrochromic layer while contacting four side edge surfaces of the electrochromic layer, so that the equipotential section by the conductive band is evenly formed to the center part of the electrochromic layer. On the other hand, when the conductive band is not formed or when the conductive band is formed only on a part of the side surface of the electrochromic layer, enlargement of the equipotential section and thus homogenization of the electrochromic degree, and improvement of the color-switching speed cannot be expected.

Figure 1:
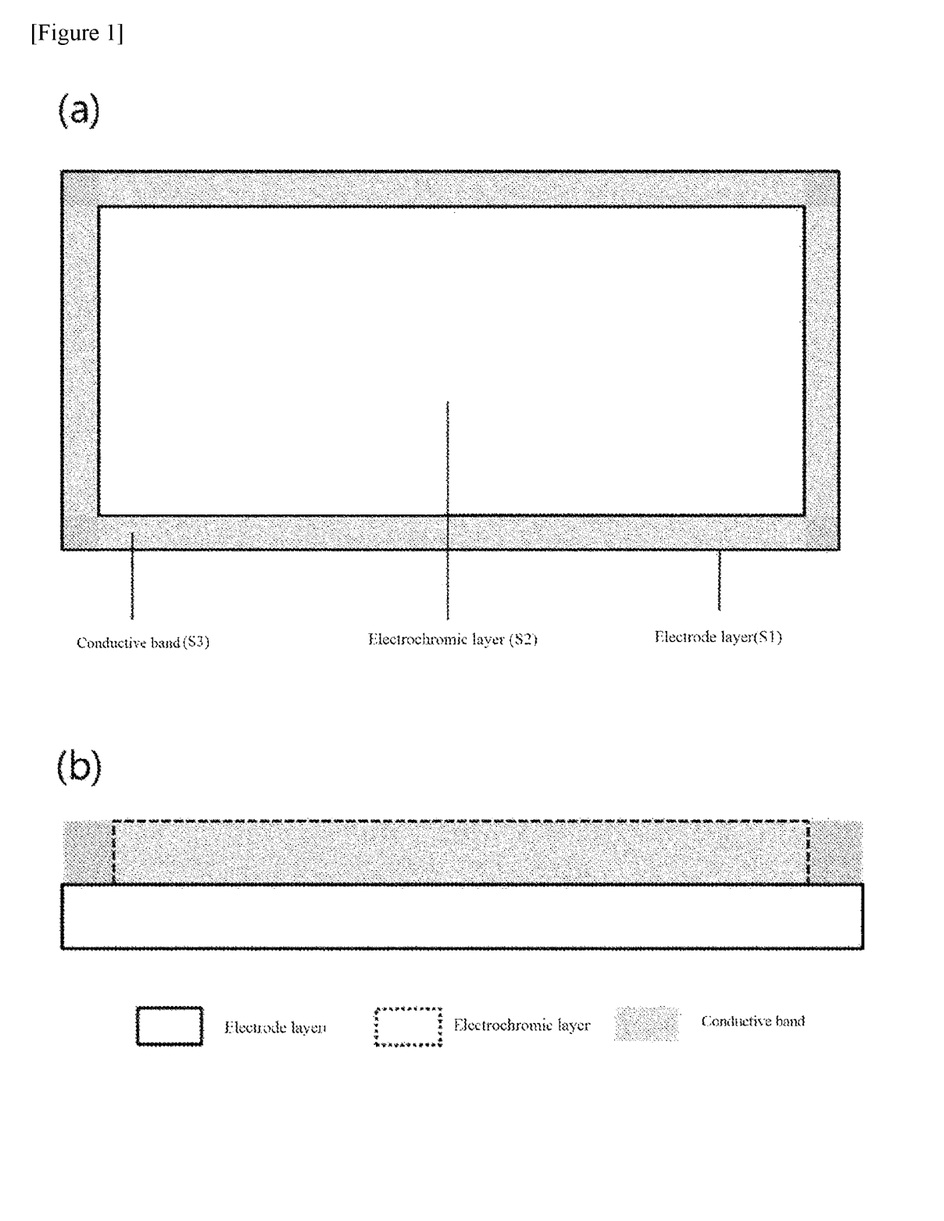
FIG. 1 schematically shows an area relationship of an electrode layer, an electrochromic layer and a conductive band, according to one example of the present application.

As described above, when the conductive band has a closed ring shape surrounding the side surface of the electrochromic layer, the electrode layer may have an area equal to or larger than the sum of the area of the conductive band and the area of the electrochromic layer. In the present application, the "area" may mean an area in which the relevant structure is viewed, for example, an orthogonal projection area, when the device is observed from the upper part or the lower part in the direction parallel to the normal direction of the surface thereof, unless otherwise specified. Therefore, the increase or decrease of the actual area due to the unevenness that the structure to be subjected to the area comparison has is not considered. FIG. 1 schematically shows an area relationship between an electrode layer, an electrochromic layer and a conductive band according to one example of the present application. As in FIG. 1, the area (S1) of the electrode layer may be the same size as the sum of the area (S2) of the electrochromic layer and the area (S3) of the conductive band. In this case, the shapes of the conductive band and the electrochromic layer observed at the upper part or the lower part in the direction parallel to the normal direction of the device surface may be the same in a quadrangle.

In one example, when the conductive band has a closed ring shape surrounding (or wrapping around) the side surface of the electrochromic layer, each of the electrochromic layer and the conductive band may be in direct contact with the same one surface of the electrode layer.

In one example, the conductive band may have a thickness equal to or greater than that of the electrochromic layer. Specifically, when the conductive band and the electrochromic layer are each positioned on the electrode layer while directly contacting the same one surface of the electrode layer, the normal line of the conductive band from the lower surface to the upper surface may be equal to or larger than that of the electrochromic layer.

The method of forming the conductive band so that it surrounds the side surface of the electrochromic layer and the area relationship described in FIG. 1 is satisfied, is not particularly limited. For example, after the electrochromic layer is formed on the electrode layer, the edge of the electrochromic layer may be etched so that the area of the electrochromic layer is smaller than the area of the electrode layer, and the conductive band may be formed on the site where the electrochromic layer is etched so as to surround the side surface of the electrochromic layer. Alternatively, even if the etching is not performed, the electrochromic layer having a smaller size than the electrode layer may be formed on the electrode layer and the conductive band may also be formed so as to surround the side surface of the electrochromic layer. In addition, the conductive band may be attached to a predetermined portion in the form of a tape having a pressure-sensitive adhesive surface, or may be formed by applying a conductive composition to a predetermined portion, followed by sintering or drying.

In another example, the conductive band may be located on the upper surface or the lower surface of the electrochromic layer. More specifically, the conductive band may be in direct contact with the electrode layer and the electrochromic layer while being positioned between the electrode layer and the electrochromic layer, or may be in direct contact with the electrochromic layer while being positioned on the opposite one surface of one surface of the electrochromic layer facing the electrode layer.

Figure 2:
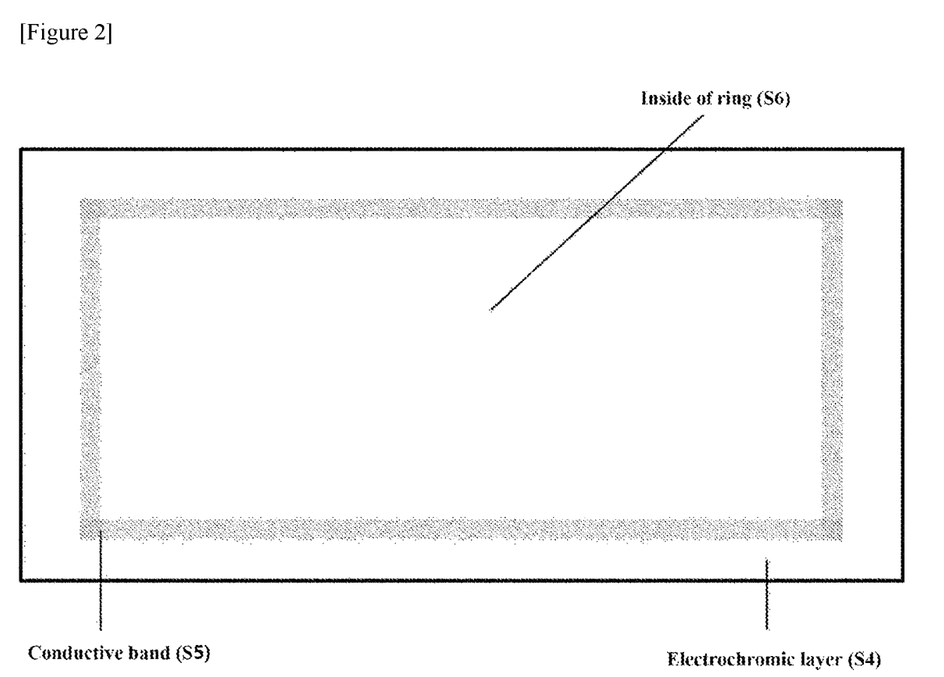
FIG. 2 schematically shows an area relationship of an electrochromic layer and a conductive band, according to one example of the present application.

As above, when the conductive band is located on the upper surface or the lower surface of the electrochromic layer, the electrochromic layer may have an area equal to or larger than the sum of the area of the conductive band and the internal area of the closed ring of the conductive band. For example, as in FIG. 2, the area (S4) of the electrochromic layer may be equal to or larger than the sum of the area (S5) of the conductive band and the area (S6) inside the ring. In one example, the shapes of the conductive band and the electrochromic layer observed in the upper part or the lower part in the direction parallel to the normal direction of the device surface may be the same in a quadrangle. In addition, without being particularly limited, in such a case, the electrochromic layer may have an area equal to or smaller than that of the electrode layer.

As above, the method of providing the conductive band on the upper surface or the lower surface of the electrochromic layer is not particularly limited. For example, a conductive layer may be formed on the upper surface or the lower surface of the electrochromic layer using a known coating method, and the conductive band may be provided by etching the conductive layer to have a closed ring shape. Alternatively, a conductive band may be provided on the upper surface or the lower surface of the electrochromic layer using a tape-shaped conductive band.

As above, when the conductive band is located on the upper surface or the lower surface of the electrochromic layer and satisfies a specific area relationship, the electrochromic device may further comprise a wiring part (not shown) electrically connected to the conductive band. The wiring part may be used to connect the electrode layer and the conductive band.

In one example, the conductive band may comprise a metal as the conductive material. The kind of metal is not particularly limited, and for example, nickel (Ni), aluminum (Al), silver (Ag), copper (Cu), zinc (Zn), gold (Au), palladium (Pd), platinum (Pt) or an alloy thereof can be used for the conductive band.

In one example, the resistance value of the conductive band may be 10% or less of the electrode layer resistance value. When such a relationship is satisfied, the color-switching speed of the device can be further improved.

Without being particularly limited, the conductive band may have a breadth or width of 100 nm or less. Specifically, the conductive band may have a width of 70 nm or less, 50 nm or less, 30 nm or less, 20 nm or less, or 15 nm or less, and may have a thickness of 1 nm or more, 3 nm or more, or 5 nm or more.

Without being particularly limited, the conductive band may have a thickness of 1,200 nm or less. More specifically, it may have a thickness of 1,100 nm or less, 900 nm or less, 700 nm or less, or 500 nm or less, and may have a thickness of 100 nm or more, 200 nm or more, 300 nm or more, 400 nm or more, or 500 nm or more.

The electrochromic device may comprise an electrolyte layer on the opposite one surface of one surface of the electrochromic layer facing the electrode layer. In one example related to this, the electrochromic device may comprise an electrode layer, a conductive band, an electrochromic layer and an electrolyte layer sequentially, or may sequentially comprise an electrode layer, an electrochromic layer, a conductive band and an electrolyte layer. In another example, the electrochromic device may comprise an electrode layer, an electrochromic layer and an electrolyte layer, but may be configured so that the conductive band surrounding the side surface of the electrochromic layer is positioned between the electrode layer and the electrolyte layer, like the electrochromic layer.

The electrolyte layer may be a configuration providing electrolyte ions involved in an electrochromic reaction. The electrolyte ion is a monovalent cation to be inserted into the conductive laminate, which may be, for example, $H^+$, $Li^+$, $Na^+$, $K^+$, $Rb^+$ or $Cs^+$.

In one example, the electrolyte layer may comprise a gel polymer electrolyte. The gel polymer electrolyte has ionic conductivity but does not have electrical conductivity. Therefore, as described below, when a second conductive band is further present on one side of the counter electrode layer, the gel polymer present between two conductive bands can prevent a short of the device. In addition, the gel polymer electrolyte can also serve as a buffer for the difference in level, that is, the difference in thickness that may exist between the electrochromic layer and the conductive band.

In one example, the gel polymer electrolyte may comprise a polymer. The usable polymer may include polyvinylidene fluoride (PVdF), polyacrylonitrile (PAN), polymethylmethacrylate (PMMA), polyvinyl chloride (PVC), polyethylene oxide (PEO), polypropylene oxide (PPO), poly(vinylidene fluoride-hexafluoropropylene) (PVdF-HFP), polyvinyl acetate (PVAc), polyoxyethylene (POE), polyamideimide (PAI), and the like.

In one example, the electrolyte layer may comprise a metal salt compound capable of providing a monovalent cation to the electrochromic layer or an ion storage layer to be described below. For example, the electrolyte layer may comprise a lithium salt compound such as $LiPF_6$, $LiAsF_6$, $LiCF_3SO_3$, $LiN(CF_3SO_2)_2$, $LiBF_4$, $LiSbF_6$, $LiN(C_2FsSO_2)_2$, $LiAlO_4$, $LiAlCl_4$, $LiCo_{0.2}Ni_{0.56}Mn_{0.27}O_2$, $LiCoO_2$, $LiSO_3CF_3$ or $LiClO_4$, or a sodium salt compound such as $NaClO_4$.

In another example, the electrolyte layer may further comprise a carbonate compound as a solvent. Since the carbonate-based compound has a high dielectric constant, ion conductivity can be increased. As a non-limiting example, a solvent, such as PC (propylene carbonate), EC (ethylene carbonate), DMC (dimethyl carbonate), DEC (diethyl carbonate) or EMC (ethylmethyl carbonate), may be used as the carbonate-based compound.

In one example, when the conductive band exists while surrounding the side surface of the electrochromic layer, the electrolyte layer may have an area equal to or larger than the sum of the area of the conductive band and the area of the electrochromic layer. Through this configuration, it is possible to prevent a short.

In another example, when the conductive band is located on the upper surface or the lower surface of the electrochromic layer, the electrolyte layer may have an area equal to or larger than the sum of the area of the conductive band and the internal area of the ring of the conductive band. Through this configuration, it is possible to prevent a short.

In another example, the area of the electrolyte layer may be different or equal to the area of the above-described electrode layer. In addition, the area of the electrolyte layer may be different or equal to the area of a counter electrode layer to be described below.

Without being particularly limited, the electrolyte layer may have light transmittance in a range of 60% to 95%, and may have a thickness in a range of 10 μm to 300 μm.

The electrochromic device may further comprise a counter electrode layer on the opposite one surface of one surface of the electrolyte layer that the electrochromic layer faces. The configuration and other characteristics of the counter electrode layer are the same as those described in connection with the electrode layer.

The electrochromic device of the present application may further comprise an ion storage layer. The ion storage layer means a layer formed to match charge balance with the electrochromic layer upon a reversible oxidation-reduction reaction for electrochromic of the electrochromic material. The ion storage layer may be located on one side of the counter electrode layer. More specifically, the ion storage layer may be located between the counter electrode layer and the electrolyte layer.

The ion storage layer may comprise an electrochromic material having a coloring property different from that of the electrochromic material used in the electrochromic layer. For example, when the electrochromic layer comprises a reducing electrochromic material, the ion storage layer may comprise an oxidizing electrochromic material. Also, the opposite is possible.

Without being particularly limited, the ion storage layer may have a thickness of 400 nm or less. More specifically, the ion storage layer may have a thickness of 30 nm or more, 50 nm or more, 100 nm or more, or 150 nm or more, and may have a thickness of 350 nm or less or 300 nm or less.

In one example, the electrochromic device of the present application may further comprise a second conductive band. In this case, two conductive bands included in the electrochromic device of the present application may be referred to as a first conductive band and a second conductive band, respectively. The configuration or characteristics of the second conductive band itself or the relationship with the adjacent layer may be the same as those of the above-described conductive band, for instance, the second conductive band may have a closed ring shape. In this case, the explanation about the electrochromic layer can be applied to the ion storage layer, and the explanation about the electrode layer can be applied to the counter electrode layer.

In one example, the second conductive band may be physically in direct contact with the ion storage layer.

In another example, the second conductive band may be in contact with the ion storage layer, while surrounding the side surface of the ion storage layer. In this case, the counter electrode layer may have an area equal to or larger than the sum of the area of the second conductive band and the area of the ion storage layer. At this time, each of the ion storage layer and the second conductive band may be in direct contact with the same one surface of the counter electrode layer. In addition, the second conductive band may have a thickness equal to or greater than that of the ion storage layer.

In another example, the second conductive band may be located on the upper surface or the lower surface of the ion storage layer. More specifically, the second conductive band may be in direct contact with the counter electrode layer and the ion storage layer while being positioned between the counter electrode layer and the ion storage layer. Alternatively, it may be in direct contact with the ion storage layer, while being positioned on the opposite one surface of one surface of the ion storage layer facing the counter electrode layer, that is, while being positioned between the electrolyte layer and the ion storage layer. As above, when the second conductive band is located on the upper surface or the lower surface of the ion storage layer, the ion storage layer may have an area equal to or larger than the sum of the area of the second conductive band and the internal area of the closed ring of the second conductive band. Furthermore, without being particularly limited, in the above case, the ion storage layer may have an area equal to or smaller than that of the counter electrode layer.

In another example, as above, when the second conductive band is located on the upper surface or the lower surface of the ion storage layer and satisfies a specific area relationship, the electrochromic device may further comprise a wiring part electrically connected to the second conductive band. The wiring part may be used to connect the counter electrode layer and the second conductive band.

In another example, when the second conductive band exists while surrounding the side surface of the ion storage layer, the electrolyte layer may have an area equal to or larger than the sum of the area of the second conductive band and the area of the ion storage layer.

In another example, when the second conductive band is located on the upper surface or the lower surface of the ion storage layer, the electrolyte layer may have an area equal to or larger than the sum of the area of the second conductive band and the internal area of the ring of the second conductive band.

In one example, the electrochromic device may further comprise a light-transmitting base material. The light-transmitting base material may be located on the lateral surface of the device, specifically, on the lateral surfaces of the electrode layer and/or the counter electrode layer.

The light-transmitting base material may be, for example, a base material having visible light transmittance of about 60% to 95%. If the transmittance in the above range is satisfied, the type of the base material to be used is not particularly limited. For example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)), or a polyolefin film such as PE (polyethylene) or PP (polypropylene), and the like may be used, without being limited thereto.

The electrochromic device may further comprise a power source. The method of electrically connecting the power source to the device is not particularly limited, which may be suitably performed by those skilled in the art. The electrochromic device may apply a predetermined voltage required for electrochromism.

Advantageous Effects

According to one example of the present application, an electrochromic device having improved electrochromism rate and uniform degree of electrochromic can be provided.

BEST MODE

Hereinafter, the present application will be described in detail through Example. However, the scope of protection of the present application is not limited by Example to be described below.

<Method of Measuring Electrochromism Time>

*Transmittance: measured using oceanoptics. Specifically, the change in transmittance with time was measured at three points (B1, B2, and B3 points upon bleaching; C1, C2, and C3 points upon coloring), respectively, in which the horizontal length (10 cm) of the device produced below was approximately trisected.

Example

Production of First Laminate:

An ITO (thickness: 100 nm) layer and a $WO_3$ layer (thickness: 350 nm) were sequentially formed on a 150 nm thick PET base material using a deposition method. The plane areas of the ITO layer and the $WO_3$ layer were made to be a quadrangle having the same size (width×length: 10 cm×7 cm).

100 ppm of an electrolytic solution containing $LiClO_4$ (1M) and propylene carbonate (PC) and a potentiostat device were prepared, and $Li^+$ was inserted into the $WO_3$ layer by applying a voltage of −1V for 50 seconds to color the $WO_3$ layer.

Thereafter, all four edge parts of the $WO_3$ layer were etched. The width of each edge part removed by the etching was 10 nm. Then, a 10 nm wide nickel tape was attached to all four edge parts where the $WO_3$ was etched. The thickness of the used nickel tape was 1,000 nm.

Production of second laminate: An ITO (thickness: 100 nm) layer and a prussian blue (PB) layer (thickness: 350 nm) were sequentially formed on a 150 nm thick PET base material by a deposition method. The plane areas of the ITO layer and the PB layer were made to be a quadrangle having the same size (width×length: 10 cm×7 cm).

Likewise, all four edge parts of the PB layer were etched. The width of each edge part removed by the etching was 10 nm. Then, a 10 nm wide nickel tape was attached to all four edge parts where the PB was etched. The thickness of the used nickel tape was 1,000 nm.

Production of device: A device (ITO/$WO_3$/GPE/PB/ITO) was produced by bonding each laminate together via a GPE (gel polymer electrolyte) layer having an area size of 10 cm×7 cm and a thickness of 50 μm so that the $WO_3$ layer of the first laminate and the PB layer of the second laminate could face each other.

Figure 3:
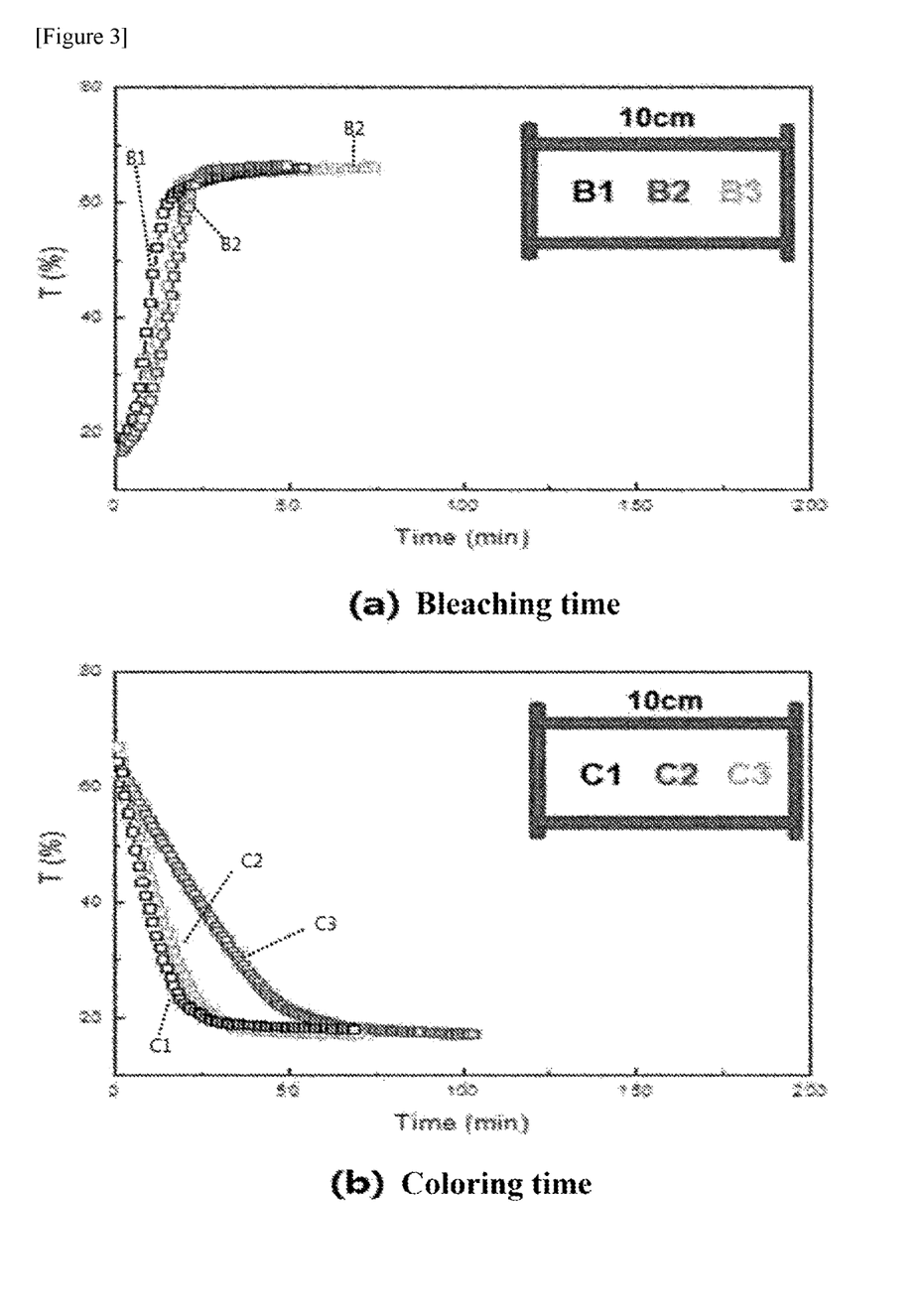
FIG. 3 is a graph relating to driving characteristics of a device of Example according to one example of the present application.

While a bleaching voltage and a coloring voltage were repeatedly applied to the device produced from the above at a constant cycle, the change in charge quantity of the device with time was observed. The bleaching and coloring voltages per cycle were 1.2V, respectively, and were applied for 50 seconds, respectively. For stabilization, a predetermined cycle was driven, and the changes of coloring and bleaching times according to the voltage application were observed. The results are as shown in FIG. 3.

Comparative Example

Figure 4:
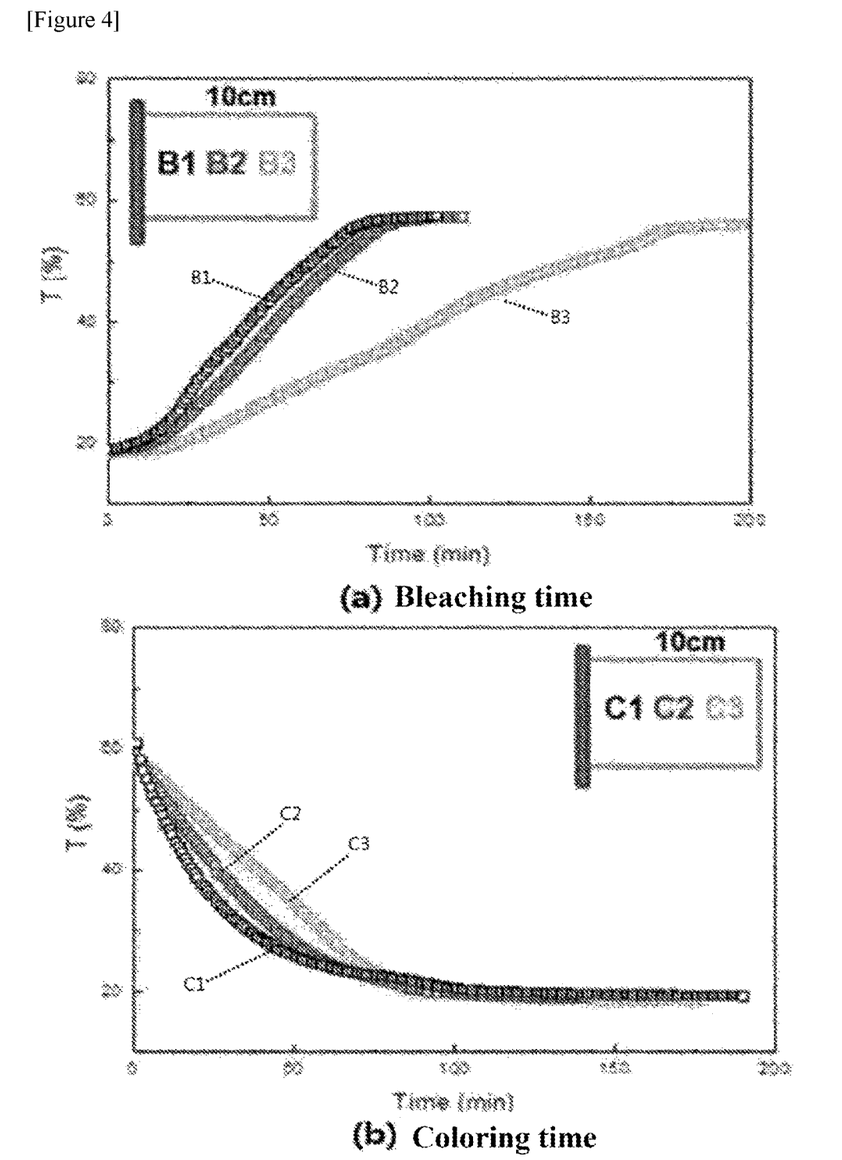
FIG. 4 is a graph relating to driving characteristics of a device of Comparative Example.
Figure 5:
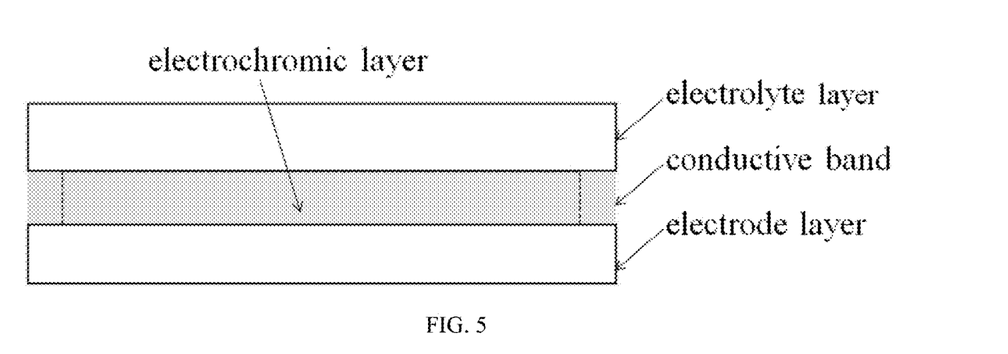
FIG. 5 schematically shows an area relationship of an electrode layer, an electrochromic layer, an electrolyte layer, and a conductive band, according to one example of the present application.
Figure 6:
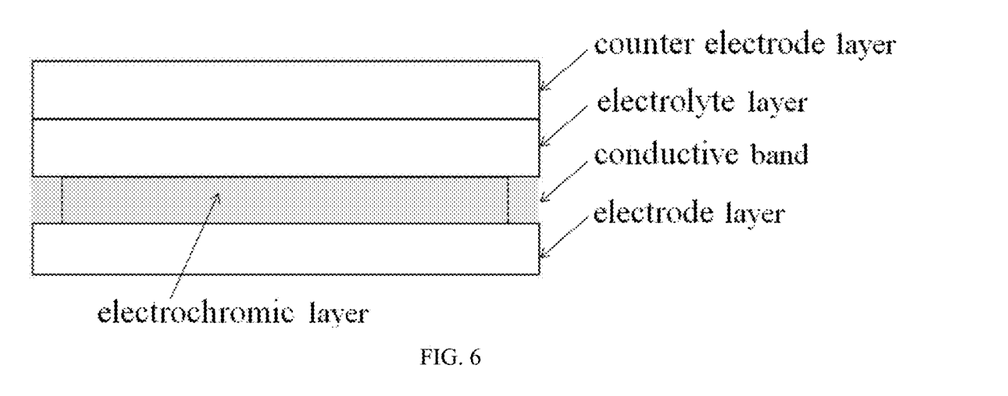
FIG. 6 schematically shows an area relationship of an electrode layer, a counter electrode layer, an electrolyte layer, an electrochromic layer and a conductive band, according to one example of the present application.
Figure 7:
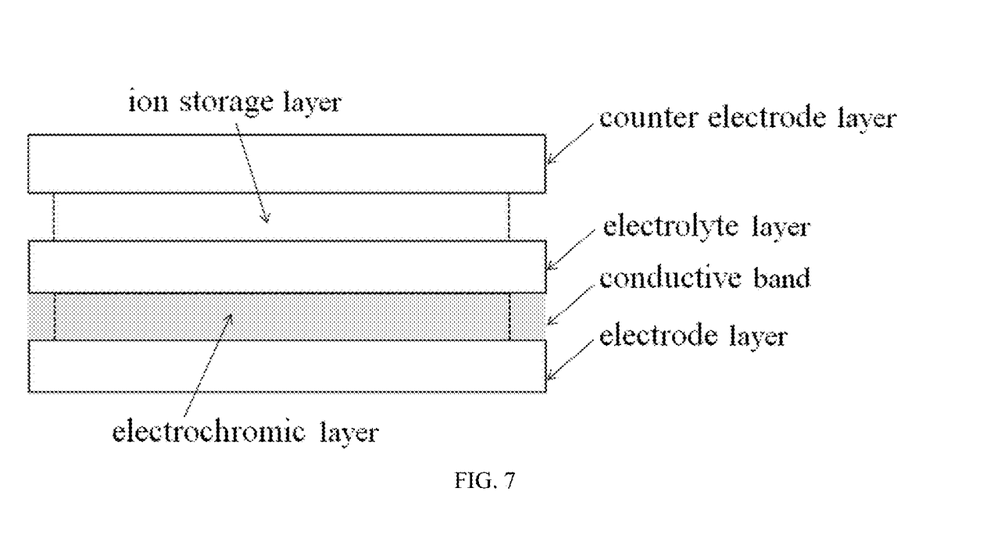
FIG. 7 schematically shows an area relationship of an electrode layer, a counter electrode layer, an electrolyte layer, an electrochromic layer, an ion storage layer, and a conductive layer, according to one example of the present application.
Figure 8:
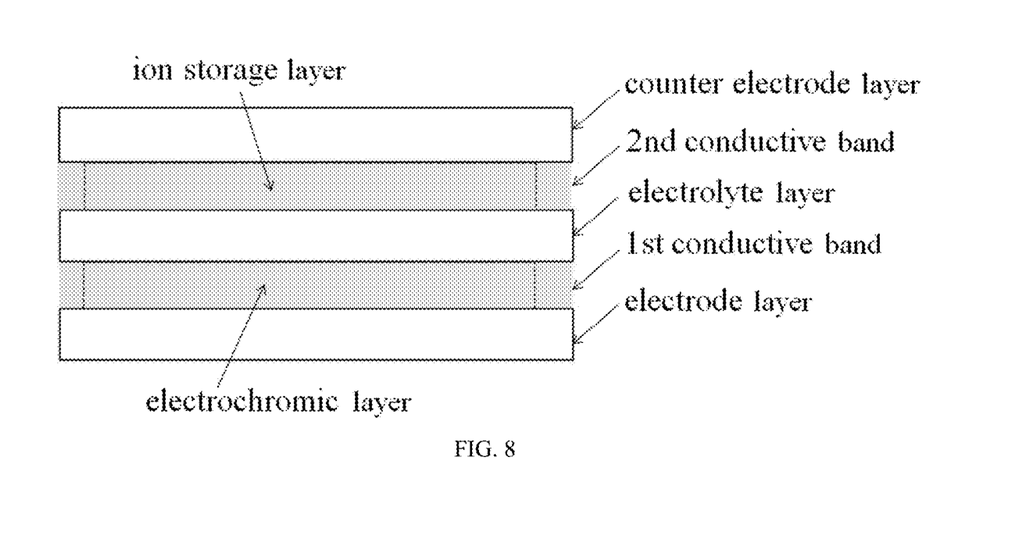
FIG. 8 schematically shows an area relationship of an electrode layer, a counter electrode layer, an electrolyte layer, an electrochromic layer, an ion storage layer, a 1st conductive layer, and a 2nd conductive layer, according to one example of the present application.

A device was produced in the same method, except that upon producing the first and second laminates, only one edge of each of the $WO_3$ layer and the PB layer was etched and the nickel tape was attached to only one etched edge. The measurement results of the color-switching times are as shown in FIG. 4.

The invention claimed is:
1. An electrochromic device, comprising:
an electrode layer;
an electrochromic layer on the electrode layer;
an electrolyte layer;
an ion storage layer;
a counter electrode layer;
a first conductive band on the electrode layer; and
a second conductive band on the electrolyte layer,
wherein the first conductive band has a closed ring shape,
   wherein the first conductive band surrounds a side surface of an edge of the electrochromic layer and directly contacts the electrochromic layer,
wherein the first conductive band is in contact with the electrode layer,
wherein the electrolyte layer is on a surface of the electrochromic layer that is opposite to a surface of the electrochromic layer facing the electrode layer, wherein the counter electrode layer is adjacent to a surface of the electrolyte layer which is opposite to a surface of the electrolyte layer facing the electrochromic layer, wherein the ion storage layer is between the counter electrode layer and the electrolyte layer, wherein the second conductive band is in direct contact with the ion storage layer, wherein the second conductive band has a closed ring shape, wherein the second conductive band surrounds a side surface of the ion storage layer, wherein the electrode layer comprises an oxide/metal/oxide (OMO) layer, wherein the OMO layer comprises an upper metal oxide layer, a lower metal oxide layer, and a metal layer provided between the two layers, wherein a visible light refractive index of the upper metal oxide layer is in a range of 1.0 to 3.0, wherein a visible light refractive index of the lower metal oxide layer is in a range of 1.3 to 2.7, wherein a visible light refractive index of the metal layer is in a range of 1 or less, wherein each of the first conductive band and the second conductive band consists of nickel (Ni), aluminum (Al), silver (Ag), copper (Cu), zinc (Zn), or gold (Au), and wherein a resistance value of the first and second conductive band is 10% or less of the electrode layer resistance value.

2. The electrochromic device according to claim 1, wherein the electrode layer has an area equal to or larger than a sum of an area of the conductive band and the area of the electrochromic layer.

3. The electrochromic device according to claim 1, wherein the first conductive band has a thickness equal to or greater than a thickness of the electrochromic layer.

4. The electrochromic device according to claim 1, wherein the electrolyte layer comprises a gel polymer electrolyte.

5. The electrochromic device according to claim 1, wherein the counter electrode layer has an area equal to or larger than a sum of an area of the second conductive band and an area of the ion storage layer.

6. The electrochromic device according to claim 5, wherein each of the ion storage layer and the second conductive band directly contacts a same one surface of the counter electrode layer.

7. The electrochromic device according to claim 6, wherein the second conductive band has a thickness equal to or greater than a thickness of the ion storage layer.

8. The electrochromic device according to claim 1, wherein the second conductive band surrounds a side surface of an edge of the ion storage layer, and wherein the second conductive band and the ion storage layer are in direct contact with the same surface of the counter electrode layer.

* * * * *